(12) United States Patent
Warner et al.

(10) Patent No.: US 7,588,490 B1
(45) Date of Patent: Sep. 15, 2009

(54) ADJUSTABLE ANIMAL CARCASS SPREADER DEVICE AND METHOD

(76) Inventors: Kelly L. Warner, 130 Buffalo Ave. South, Montrose, MN (US) 55363; John C. Warner, 130 Buffalo Ave. South, Montrose, MN (US) 55363

(\*) Notice: Subject to any disclaimer, the term of this patent is extended or adjusted under 35 U.S.C. 154(b) by 0 days.

(21) Appl. No.: 12/272,409

(22) Filed: Nov. 17, 2008

(51) Int. Cl.
*A22B 1/00* (2006.01)
(52) U.S. Cl. ...................................... 452/197
(58) Field of Classification Search ......... 452/188–192, 452/174, 185, 197; 119/728
See application file for complete search history.

(56) References Cited

U.S. PATENT DOCUMENTS 5,707,281 A * 1/1998 Hicks .......................... 452/197
7,387,567 B1 * 6/2008 Bailey ........................ 452/197

\* cited by examiner

*Primary Examiner*—Thomas Price
(74) *Attorney, Agent, or Firm*—David A. Lingbeck; Lingbeck Law Office

(57) ABSTRACT

A adjustable animal carcass spreader device for propping open the rib cage of the animal to cool the meat and dry the waste. The adjustable animal carcass spreader device includes a first elongate member, a second elongate member being adjustably and removably coupled to the first elongate member, and a coupling member for coupling the first and second elongate members.

4 Claims, 3 Drawing Sheets

ADJUSTABLE ANIMAL CARCASS SPREADER DEVICE AND METHOD

BACKGROUND OF THE INVENTION

1. Field of the Invention

The present invention relates to carcass spreaders and more particularly pertains to a new adjustable animal carcass spreader device for propping open the rib cage of the animal to cool the meat and dry the waste.

2. Description of the Prior Art

The use of carcass spreaders is known in the prior art. More specifically, carcass spreaders heretofore devised and utilized are known to consist basically of familiar, expected and obvious structural configurations, notwithstanding the myriad of designs encompassed by the crowded prior art which have been developed for the fulfillment of countless objectives and requirements.

The prior art includes a first tubular member being coupled to a second tubular member with a third tubular member being optionally coupled to one of the first and second tubular members and with removable end caps being disposed at the outer ends and not having gripping circumferences to prevent slippage of the tubular members. The prior art also includes a crossbar having a spreader arm being fixedly attached thereto and also having another spreader arm being ratchetly moved along the crossbar. While these devices fulfill their respective, particular objectives and requirements, the aforementioned patents do not disclose a new adjustable animal carcass spreader device.

SUMMARY OF THE INVENTION

The general purpose of the present invention, which will be described subsequently in greater detail, is to provide a new adjustable animal carcass spreader device which has many of the advantages of the carcass spreaders mentioned heretofore and many novel features that result in a new adjustable animal carcass spreader device which is not anticipated, rendered obvious, suggested, or even implied by any of the prior art carcass spreaders, either alone or in any combination thereof.

The present invention includes a first elongate member, a second elongate member being adjustably and removably coupled to the first elongate member, and a coupling member for coupling the first and second elongate members. None of the prior art includes the combination of the elements of the present invention.

There has thus been outlined, rather broadly, the more important features of the adjustable animal carcass spreader device in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new adjustable animal carcass spreader device which has many of the advantages of the carcass spreaders mentioned heretofore and many novel features that result in a new adjustable animal carcass spreader device which is not anticipated, rendered obvious, suggested, or even implied by any of the prior art carcass spreaders, either alone or in any combination thereof.

Still another object of the present invention is to provide a new adjustable animal carcass spreader device for propping open the rib cage of the animal to cool the meat and dry the waste.

Still yet another object of the present invention is to provide a new adjustable animal carcass spreader device that is structured to grip the inside walls of the animal carcass to ensure that the rib cage stays open and to prevent slippage.

Even still another object of the present invention is to provide a new adjustable animal carcass spreader device that can be easily and quickly adjusted for any animal size.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
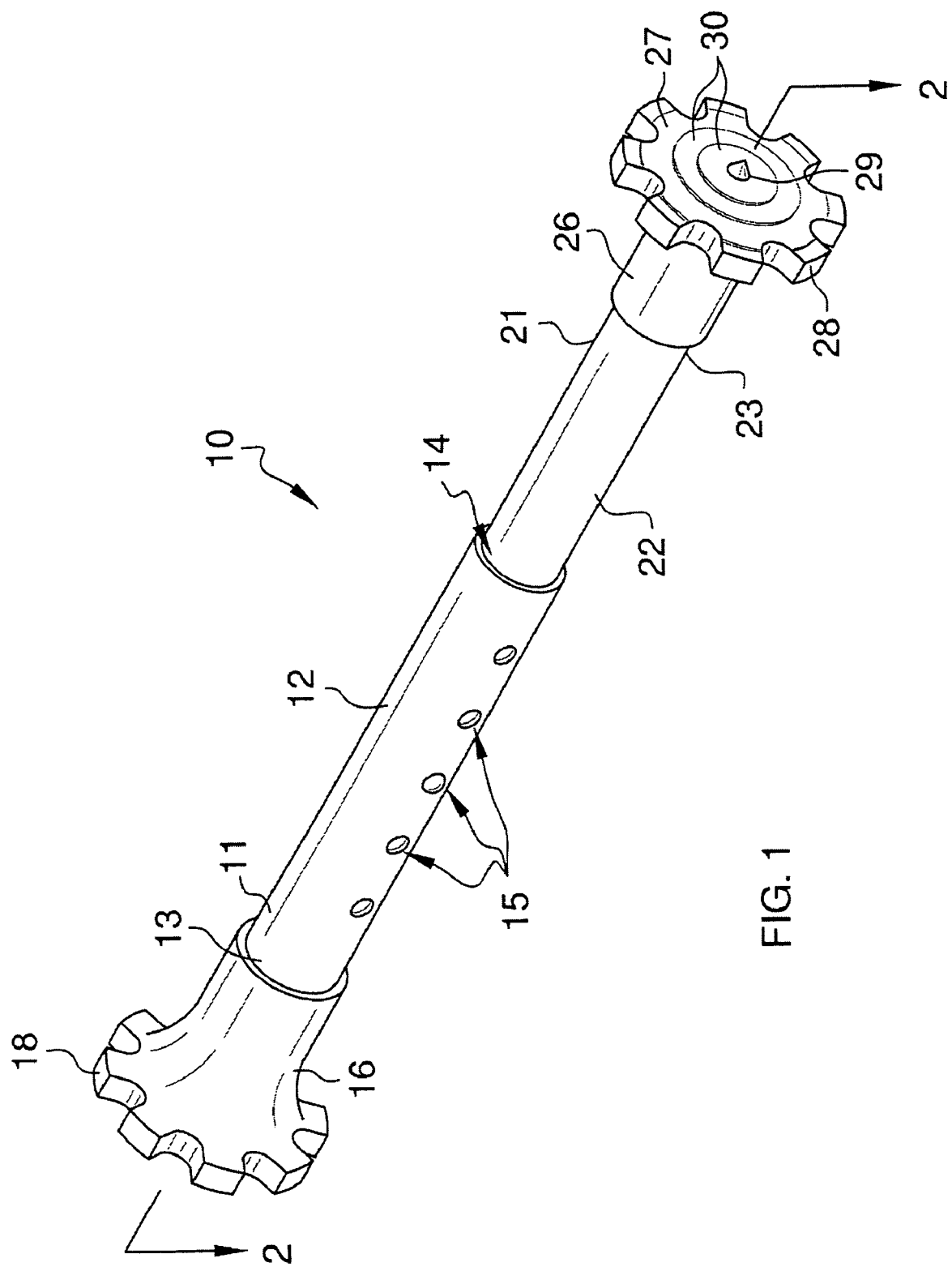
FIG. 1 is a perspective view of a new adjustable animal carcass spreader device according to the present invention.
Figure 2:
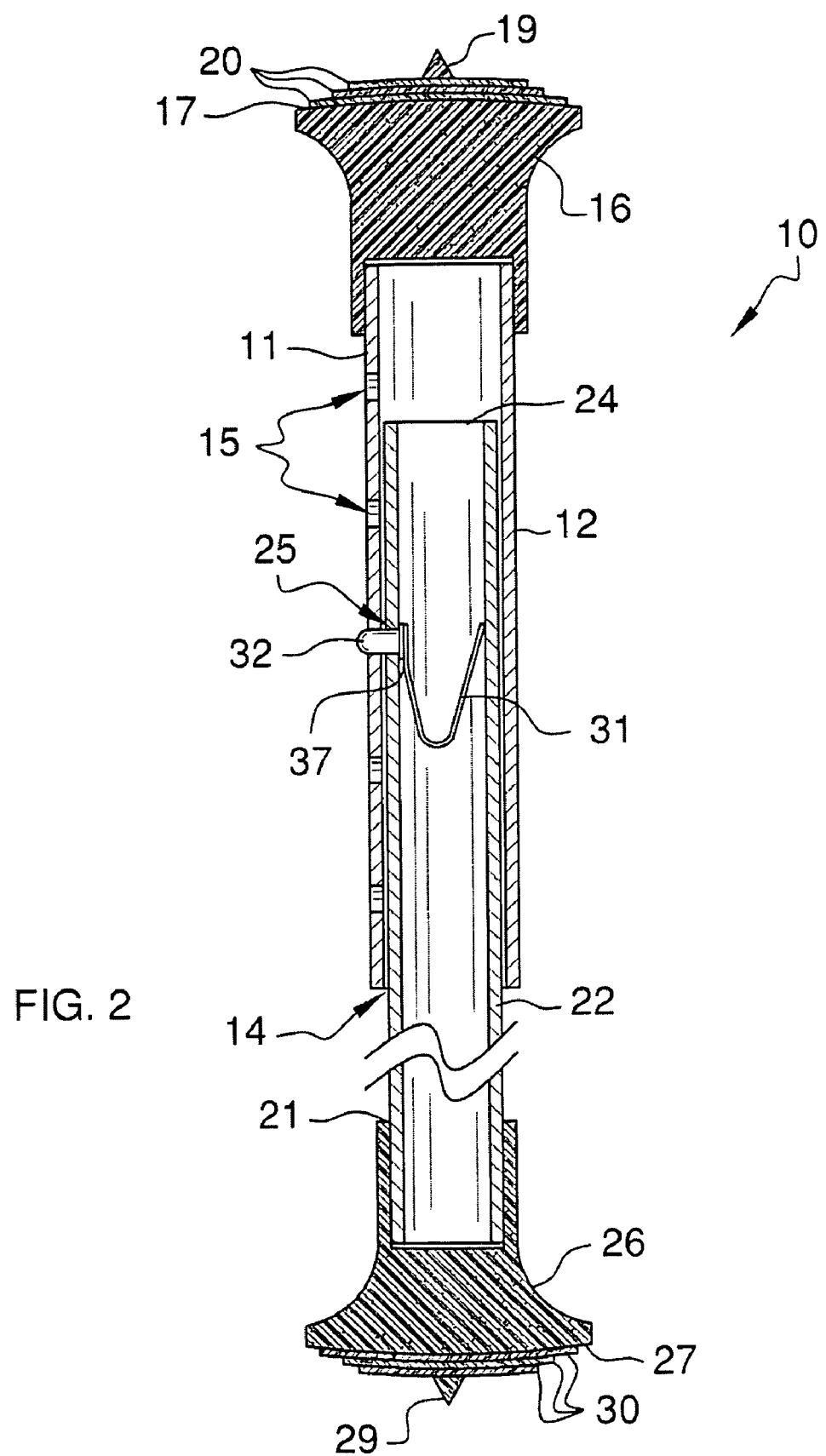
FIG. 2 is a cross-sectional plan view of the present invention.
Figure 3:
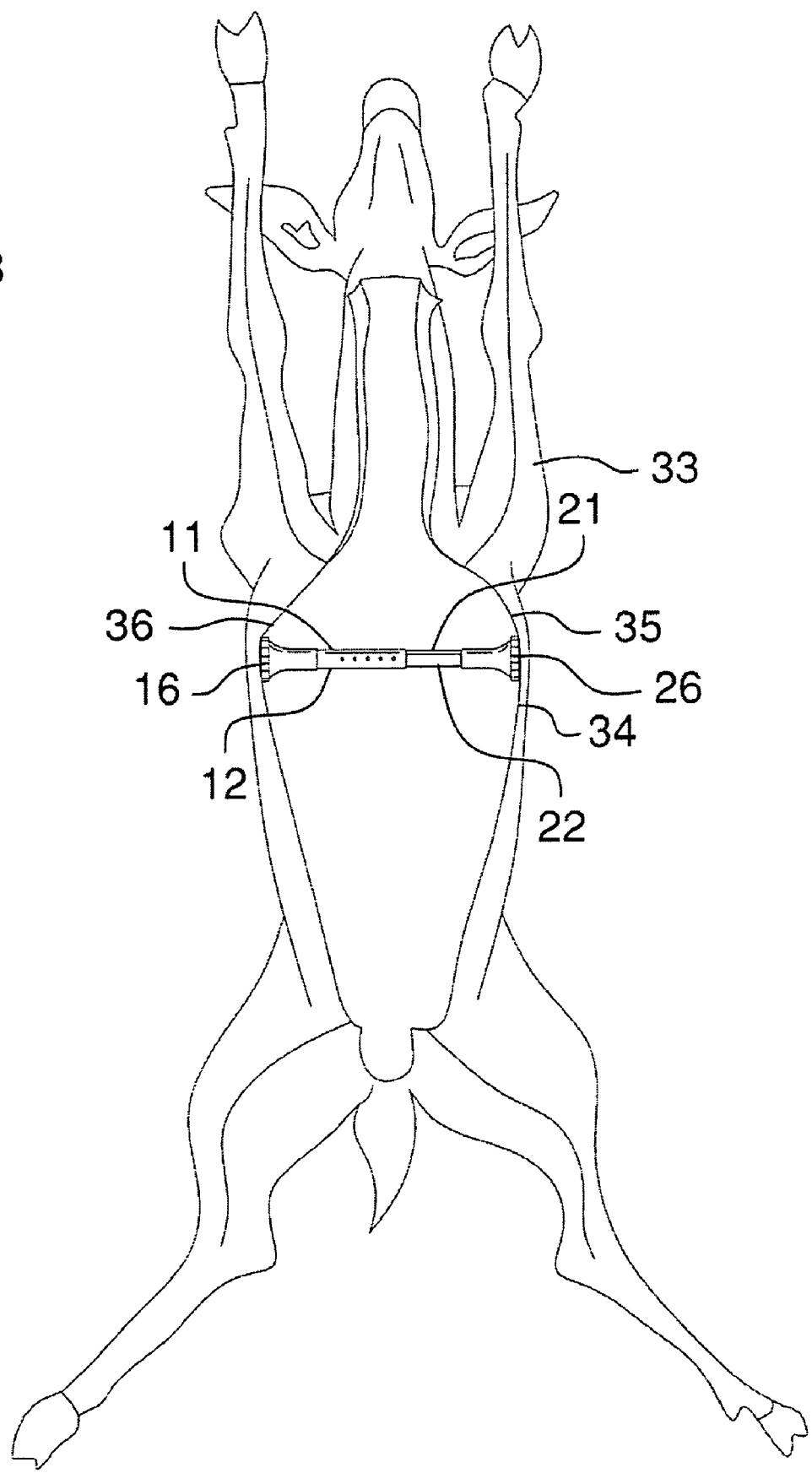
FIG. 3 is a plan view of the present invention being used on an animal carcass.

With reference now to the drawings, and in particular to FIGS. 1 through 3 thereof, a new adjustable animal carcass spreader device embodying the principles and concepts of the present invention and generally designated by the reference numeral 10 will be described.

As best illustrated in FIGS. 1 through 3, the adjustable animal carcass spreader device 10 generally comprises a first elongate member 11 and a second elongate member 21 being adjustably and removably coupled to the first elongate member 11, and also comprises a coupling member 37 for coupling the first and second elongate members 11,21. The first elongate member 11 includes a first tubular portion 12 having a hollow interior and a first carcass restraining end portion 16. The first tubular portion 12 includes a plurality of spaced holes 15 being disposed therein and being aligned longitudinally generally along a length thereof. The first tubular portion 12 also has a first end 13 and an open second end 14.

The second elongate member 21 includes a second tubular portion 22 having a hollow interior and a second carcass restraining end portion 26. The second tubular portion 22 has a first end 23 and a second end 24 and also has a hole 25 being disposed therein proximate to the second end 24. The second tubular portion 22 is movably and removably disposed in the first tubular portion 12 through the open second end 14. The coupling member 37 is conventionally disposed in the second tubular portion 22 proximate to the second end 24. The coupling member 37 includes a leaf spring 31 being conventionally disposed in the second tubular portion 22 and also includes a peg 32 being conventionally attached to an end of the leaf spring 31 and being biasedly disposed through the hole 25 in the second tubular portion 22 and through one of the holes 15 in the first tubular portion 12 to adjustably couple the first and second elongate members 11,21 together.

The first and second carcass restraining end portions 16,26 are securely and conventionally disposed at the first ends 13,23 of the first and second tubular portions 12,22, respectively. Each of the first and second carcass restraining end portions 16,26 has a perimeter to engage a rib cage 34 of the animal 33 to prevent slippage of the first and second elongate members 11,21 and has a circumference which is larger than the circumference of a respective first and second tubular portion 12,22. Each of the first and second carcass restraining end portions 16,26 is disc-shaped and has an outer side 17,27 and is disposed generally perpendicular to a respective first and second tubular portion 12,22. Each of the first and second carcass restraining end portions 16,26 has a sprocketed circumference 18,28 to facilitate engaging and restraining the rib cage 34 of the animal 33. Each of the first and second carcass restraining end portions 16,26 has at least one pointed protuberace 19,29 being conventionally disposed upon and extending outwardly from the outer side 17,27 thereof to engage the rib cage 34 of the animal 33 to prevent slippage of the first and second elongate members 11,21. Each of the first and second carcass restraining end portions 16,26 also has concentric rings 20,30 being pyramidally arranged and conventionally disposed upon the outer side 17,27 thereof to facilitate engaging and restraining the rib cage 34 of the animal 33.

In use, the user severs through the front of the rib cage 34 of the animal 33 using any suitable cleaving device, and then spreads apart the rib cage 34 of the animal 33. Then using the animal carcass spreader device 10, the user positions the coupled first and second elongate members 11,21 inside the severed rib cage 34 of the animal 33 to keep the rib cage 34 spread apart to allow the meat to cool and dry out the guts of the animal 33. The user spreads a left section 35 apart from a right section 36 of the rib cage 34 by positioning and engaging one of the sprocketed carcass restraining end portions 16,26 against one of the left and right sections 35,36 of the rib cage 34 and positioning another of the sprocketed carcass restraining end portions 16,26 against the other of the left and right sections 35,36 of the rib cage 34 with the coupled first and second elongate members 11,21 being positioned generally transversely of the carcass 33 to prevent slippage of the adjustable animal carcass spreader device 10.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the adjustable animal carcass spreader device. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An adjustable animal carcass spreader device comprising:
   a first elongate member including a first tubular portion and a first carcass restraining end portion;
   a second elongate member being adjustably and removably coupled to said first elongate member and including a second tubular portion and a second carcass restraining end portion, said first and second carcass restraining end portions being disposed at said first ends of said first and second tubular portions, respectively, each of said first and second carcass restraining end portions having a perimeter for engaging a rib cage of the animal to prevent slippage of said first and second elongate members, each of said first and second carcass restraining end portions having a circumference which is larger than the circumference of a respective said first and second tubular portion, each of said first and second carcass restraining end portions being disc-shaped and having an outer side being disposed generally perpendicular to a respective said first and second tubular portion, each of said disc-shaped first and second carcass restraining end portions having a sprocketed circumference to facilitate engaging and restraining the rib cage of the animal; and
   a coupling member for coupling said first and second elongate members.

2. An adjustable animal carcass spreader device comprising:
   a first elongate member including a first tubular portion and a first carcass restraining end portion;
   a second elongate member being adjustably and removably coupled to said first elongate member and including a second tubular portion and a second carcass restraining end portion, said first and second carcass restraining end portions being disposed at said first ends of said first and second tubular portions, respectively, each of said first and second carcass restraining end portions having a perimeter for engaging a rib cage of the animal to prevent slippage of said first and second elongate members, each of said first and second carcass restraining end portions having a circumference which is larger than the circumference of a respective said first and second tubular portion, each of said first and second carcass restraining end portions being disc-shaped and having an outer side being disposed generally perpendicular to a respective said first and second tubular portion, each of said disc-shaped first and second carcass restraining end portions having at least one pointed protuberance being attached to and extending outwardly from said outer side thereof for engaging the rib cage of the animal to prevent slippage of said first and second elongate members; and
   a coupling member for coupling said first and second elongate members.

3. A method of using an adjustable animal carcass spreader includes the steps of:
   providing first and second elongate members being adjustably coupled together and also having carcass restraining end portions, the carcass restraining end portions being disc-shaped and having a sprocketed circumference;

severing a rib cage of the animal;

spreading apart the rib cage of the animal including spreading a left section apart from a right section of the rib cage; and positioning the coupled first and second elongate members inside the severed rib cage of the animal to keep the rib cage spread apart to allow the meat to cool and dry out the guts of the animal and also positioning one of the disc-shaped carcass restraining end portions against one of the left and right sections of the rib cage and positioning another of the disc-shaped carcass restraining end portions against the other of the left and right sections of the rib cage.

4. The method of using an adjustable animal carcass spreader as described in claim 3; wherein the positioning of the coupled first and second elongate members includes engaging the sprocketed disc-shaped carcass restraining end portions against the left and right sections of the rib cage to prevent slippage thereof.

* * * * *